US006934806B2

(12) United States Patent
Genduso et al.

(10) Patent No.: US 6,934,806 B2
(45) Date of Patent: Aug. 23, 2005

(54) METHOD AND SYSTEM FOR IMPROVING INPUT/OUTPUT PERFORMANCE BY PROACTIVELY FLUSHING AND LOCKING AN ENTIRE PAGE OUT OF CACHES OF A MULTIPROCESSOR SYSTEM

(75) Inventors: Thomas Basilio Genduso, Apex, NC (US); Richard Edwin Harper, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 10/251,759

(22) Filed: Sep. 23, 2002

(65) Prior Publication Data

US 2004/0059872 A1 Mar. 25, 2004

(51) Int. Cl.[7] .............................................. G06F 12/00
(52) U.S. Cl. ........................ 711/135; 711/130; 711/133; 711/135; 711/141; 711/142; 711/143; 711/144; 710/306; 710/307; 710/200; 710/244
(58) Field of Search ............................ 711/3, 113, 130, 711/133, 135, 141–148, 202, 205, 207; 710/306–307, 200, 244; 714/4, 764

(56) References Cited

U.S. PATENT DOCUMENTS

| 4,775,955 | A | * | 10/1988 | Liu ............................. 711/145 |
| 5,301,287 | A | * | 4/1994 | Herrell et al. ............... 711/202 |
| 5,881,229 | A | * | 3/1999 | Singh et al. ................. 709/203 |
| 5,900,017 | A | | 5/1999 | Genduso et al. |
| 5,923,898 | A | | 7/1999 | Genduso et al. |
| 6,026,461 | A | * | 2/2000 | Baxter et al. ............... 710/244 |
| 6,119,150 | A | * | 9/2000 | Fujii et al. .................. 709/213 |
| 6,347,360 | B1 | * | 2/2002 | Moudgal et al. ............ 711/133 |
| 6,430,639 | B1 | * | 8/2002 | Meyer et al. ............... 710/200 |
| 6,553,430 | B1 | * | 4/2003 | Keller ........................... 710/5 |
| 6,647,453 | B1 | * | 11/2003 | Duncan et al. ............. 710/306 |

OTHER PUBLICATIONS

Bernstein P.A., Feb. 1988, IEEE Computer JNL, vol. 21, pp. 37–45.*

* cited by examiner

Primary Examiner—Donald Sparks
Assistant Examiner—Hashem Farrokh
(74) Attorney, Agent, or Firm—Eustis Dwayne Nelson, Esq.; McGinn & Gibb, PLLC

(57) ABSTRACT

A method (and system) of improving performance of a multiprocessor system, includes proactively flushing and locking an arbitrarily-sized region of memory out of caches of the multiprocessor system.

15 Claims, 18 Drawing Sheets

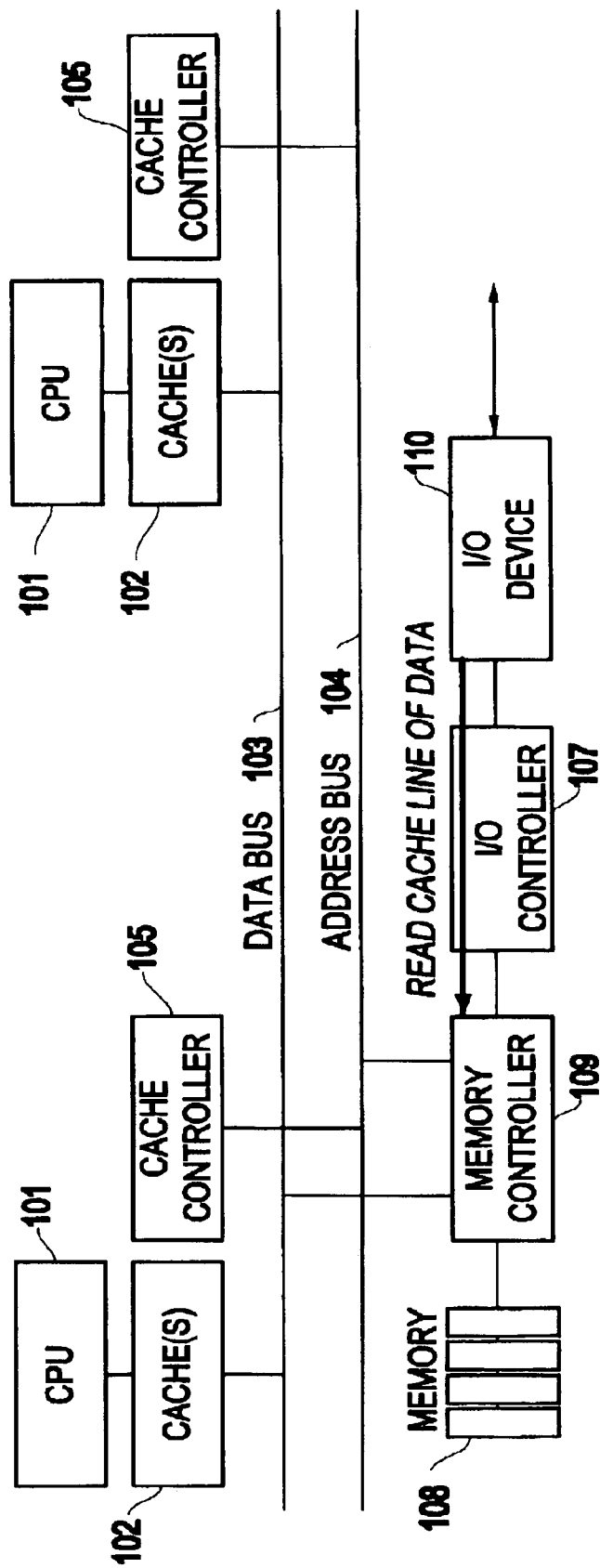

METHOD AND SYSTEM FOR IMPROVING INPUT/OUTPUT PERFORMANCE BY PROACTIVELY FLUSHING AND LOCKING AN ENTIRE PAGE OUT OF CACHES OF A MULTIPROCESSOR SYSTEM

BACKGROUND OF THE INVENTION

1. Field of the Invention

The present invention generally relates to a multiprocessor system, and more particularly to a method and system for improving input/output (I/O) performance by proactively flushing and locking an entire page out of caches of the multiprocessor system.

2. Description of the Related Art

When an I/O device, such as a Gigabit Ethernet device or InfiniBand® adapter, must access data to be sent out of, or into, a computer system, it must access (e.g., read or write, respectively) a block of that data from host memory. In a cache coherent processor or multiprocessor, a copy of that data may be stored in the caches of one or more processors. This data may have a number of states relative to its coherency. For example, it can be "dirty" (i.e., it is exclusively owned by one processor and more recently updated than its in-memory copy) or it can be "clean" (i.e., it may reside in the caches of several processor caches but is not more recent than the in-memory copy).

As the I/O device presents its read or write requests to the host memory, the I/O device must "snoop" the data from the processor caches in order to inform any processor that has a "dirty" copy of the data that it no longer has an exclusive copy of that data. This also causes any processor owning a dirty copy to write that data back to memory so that the I/O device can get the most recent copy. If the access is a write, then all processor caches must also invalidate their local copies of the data, because the I/O device is about to update that data in host memory.

This requirement for "snooping" and acquisition of data from the processor caches reduces system performance. That is, the necessity to snoop the processor caches reduces the performance of I/O because this lengthens the time required to obtain a single piece of data, even if it is "clean".

The snoops due to the I/O device also increase the workload on all interfaces between the I/O device and the processor caches, and the workload on the processor caches themselves.

Currently, some existing processors possess a "flush data cache entry" (FDC) instruction that can be invoked by the programmer (e.g., manually invoked).

That is, when the programmer knows (e.g., through the I/O device driver or the like) that a processor cache line may be dirty in its local cache, and yet will soon be accessed by the I/O device, the programmer can invoke the FDC instruction on that line. This invocation of the FDC instruction causes the most recent copy resident in the processor cache to be found, written back to memory, and the corresponding processor cache line marked as "clean."

Thus, in this case, the programmer referred to above is typically the one who is writing the I/O device driver, and this programmer is responsible for filling in data buffers from some source and placing them into a particular location and signaling the I/O adaptor to come and get the data. Hence, the programmer places the data in the location desired, flushes the data, and then signals the I/O adaptor.

Thus, when the I/O device subsequently must access the data, that line will already be in host memory, and therefore it will not be necessary for that line to be provided by the processor cache, with a corresponding reduction in bus bandwidth and processor cache utilization.

Furthermore, because the connections between the host memory and the I/O device are usually less complex and less time-consuming than the processor cache (and snoops can be avoided if the memory is marked as incoherent), the desired data can be more rapidly accessed by the I/O device. Hence, a block of data in host memory can be more efficiently accessed by the I/O device than when it is in the processor cache, so that the desired data can be more rapidly accessed by the I/O device.

More specifically, it is easier for the I/O device to make such an access (as compared to the processor cache) as there are less protocols involved (e.g., in the way) and less chip crossings for the I/O device to make between the I/O and the memory and back.

However, all known implementations of the FDC instruction only flush a single cache line, which is usually 64 to 128 bytes, whereas an I/O device typically accesses an entire page of data, which could range from 512 to 4096 bytes in size.

Thus, for the processor to flush an entire page of I/O data, it must repeatedly invoke (e.g., sequentially invoke one-by-one) the FDC instruction for all cache lines belonging to that page. This is extremely cumbersome.

Hence, currently in the conventional systems, blocks of lines (and certainly blocks of lines having arbitrary sizes) cannot be flushed, but instead each line must be flushed one at a time. Moreover, prior to the present invention, there has been no recognition that different devices use different block sizes, and that it would be useful to flush such blocks having different sizes. For example, a disk driver may have a block size of 2000 or 4000 bytes, whereas a network system may have a block size of only 1000 bytes.

Furthermore, another problem is that, in a multiple processor system, once a page has been flushed and I/O to that page is being performed, there is no mechanism which prevents a processor from accessing that page of memory while the I/O operation is in progress. That is, there has been no lock mechanism or the like provided for preventing access to the memory page undergoing an I/O operation.

Additionally, other processors cannot obtain the data that has been flushed. This is very inconvenient (especially for blocks which are frequently accessed) when other processors wish to access frequently a particular block.

SUMMARY OF THE INVENTION

In view of the foregoing and other problems, drawbacks, and disadvantages of the conventional methods and structures, an object of the present invention is to provide a method and structure in which an entire page (blocks) of a cache can be flushed in one bus transaction.

Yet another object of the present invention is to provide a mechanism for flushing blocks of lines having different, arbitrary sizes.

Another object is to lock that page by invoking a new "flush cache page and lock" (FCPL) transaction, which can be invoked either by a processor or an I/O Controller.

In a first aspect of the present invention, a method (and system) of improving performance of a multiprocessor system, includes proactively flushing and locking an arbitrarily-sized region out of caches of the multiprocessor system.

In a second aspect of the present invention, a method of improving performance of a multiprocessor system, includes issuing a flush cache page and lock (FCPL) transaction and waiting for acknowledgments from all other processors, invalidating and writing back dirty lines on that page, concurrently invalidating a Table Lookaside Buffer (TLB) entry for that page, transmitting an acknowledgment over the address bus, updating the page table to lock accesses to physical page for which input/output (I/O) is imminent, setting the physical page for which I/O is imminent to "noncoherent", thereby to prevent snoops to the processor caches when accesses to the target page are made, starting I/O to/from the target page, transferring data between the I/O Device and the Memory, generating an "I/O Complete" interrupt to the initiating processor, and setting the target page to "coherent" and unlocking the page table.

In a third aspect of the present invention, a system for improving performance of a multiprocessor system, includes a device for an initiating processor or an I/O Controller to generate a flush cache and page lock (FCPL) bus transaction under program control, a device for a cache controller on the initiating processor to generate a FCPL bus transaction on the address bus and wait for an acknowledgment from respondent cache controllers, a device for a respondent cache controller to receive an FCPL bus transaction, invalidate and write back all cache lines that reside on the physical page indicated by the FCPL bus instruction, invalidate Translation Lookaside Buffer (TLB) entries associated with that physical page, and provide an acknowledgment to the initiating processor, and a device for dynamically setting a given memory region to be either "coherent" or "noncoherent" under program control.

In a fourth aspect of the present invention, a signal-bearing medium is provided tangibly embodying a program of machine-readable instructions executable by a digital processing apparatus to perform a method of improving performance of a multiprocessor system, the method including proactively flushing and locking an arbitrarily-sized region of memory out of caches of the multiprocessor system.

With the unique and unobvious aspects of the present invention, a programmer is allowed to flush an entire page (block) of data from the cache in one bus transaction and then lock that page by invoking a unique "flush cache page and lock" (FCPL) transaction, which can be invoked either by a processor or an I/O Controller (i.e., the transaction can be initiated via an FCPL instruction within a processor or via a move to a device control register (MVDCR) within an I/O device or processor). Such pages (blocks) may have different, arbitrary sizes.

Preferably, an FCPL transaction according to the invention contains a starting physical address of a page, and a number of lines (or bytes) in that page.

The assumption is made that the processor connection of the processor to the rest of the system includes an address bus. The address bus is the mechanism for transmitting the address of the data that is to be referenced as well as for specifying the type of transactions which are to occur (i.e., data write, data read, snoop, etc.) When any processor cache receives this transaction on its address bus, it finds and invalidates all lines residing in the indicated page prior to responding to the initiator of the transaction that the transaction has been completed.

During the invalidation process, each processor cache controller that receives the FCPL transaction searches its local cache for all copies of the data on that page. Accordingly, dirty copies are written back to memory, and both dirty and clean copies are marked as "invalid."

An FCPL for a given page can also be sent to the processor caches by an I/O device instead of by a processor, prior to the I/O device's performing a direct memory access (DMA) to or from that page in host memory.

Once the FCPL instruction has completed the invalidation operation, the flushed page can be marked as "locked" (i.e., a processor cannot access that page until further notice) via the following process. The translation look-aside buffer (TLB) entry for the flushed page is cleared, the TLB entries for the flushed page in the other processors are nullified immediately, and an indicator in the page table entry in main memory is "set" indicating that this page of physical memory is locked. Finally, the page can be marked as "noncoherent."

Such an operation relieves the I/O device from the necessity of snooping the processor caches while the actual I/O operation is being performed. Thus, much time is saved and unnecessary operations do not have to be performed. Hence, the I/O device can bypass the processor caches entirely, and can go straight to memory to obtain the data. Should a processor attempt to access a page while it is "locked", a memory protection violation error will occur, thereby giving the requesting processor the opportunity to retry the access if possible.

Once the I/O operation is completed, the processor will issue an Unlock Cache Page (ULCP) transaction. The ULCP allows the page to be accessed by the processors by "resetting" the lock indicator in the page table entry and resetting the page to be coherent.

Hence, the present invention is advantageous over the conventional repeated invocations of the FDC instruction by allowing a processor or I/O Device to flush an entire page of data with a single bus transaction, thereby reducing the number of processor instructions and bus transactions required to flush data.

In systems in which the I/O controller can generate bus transactions, if such an I/O controller performs the FCPL transaction, the number of processor instructions falls to zero.

Furthermore, because the I/O controller can now access the page without snooping the processor caches at all, the address bus bandwidth consumption is reduced. Thus, the availability of an FCPL reduces the processor workload, reduces the time required to prepare a page of data for I/O, and reduces address bus utilization, thereby resulting in an improvement in system and I/O performance.

BRIEF DESCRIPTION OF THE DRAWINGS

The foregoing and other purposes, aspects and advantages will be better understood from the following detailed description of a preferred embodiment of the invention with reference to the drawings, in which:

FIG. 2A illustrates cache data (e.g., dirty data "x") to be flushed;

FIG. 2B illustrates a CPU 101 issuing an FDC instruction to a local cache controller 105;

FIG. 2C illustrates the local cache controller 105 commanding all cache controllers 105 to flush dirty data "x"; and FIG. 2D illustrates the cache 102 flushing dirty data "x" to the memory 108;

FIG. 2E illustrates an input/output (I/O) read, request phase;

DETAILED DESCRIPTION OF PREFERRED EMBODIMENTS OF THE INVENTION

Figure 1:
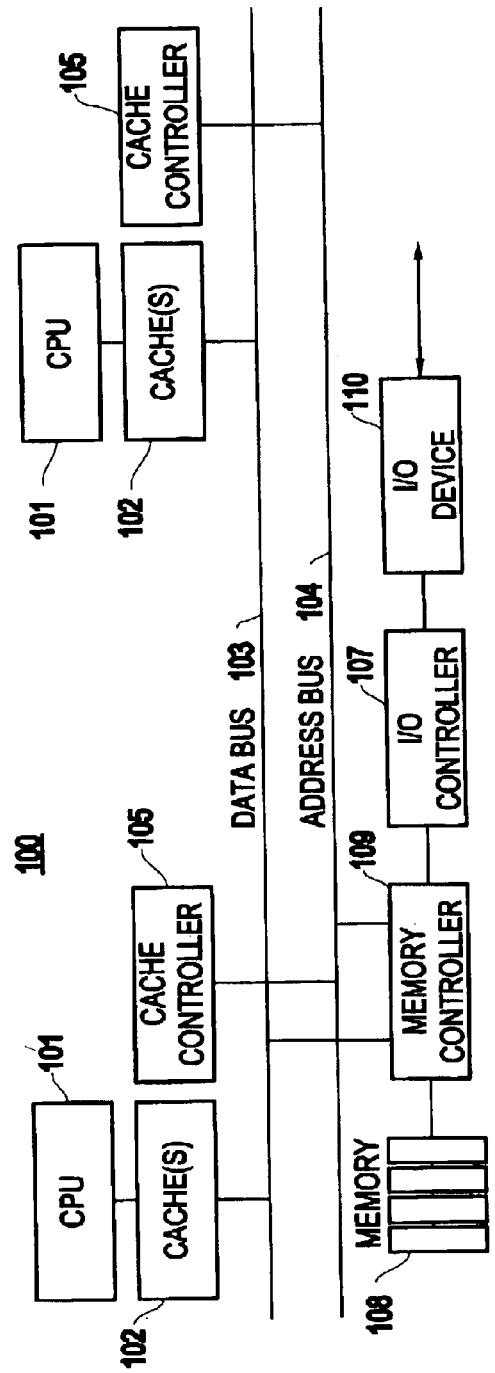
FIG. 1 illustrates a basic symmetric multiprocessor architecture 100.

Referring now to the drawings, and more particularly to FIGS. 6–18, there are shown preferred embodiments of the method and structures according to the present invention.
Preferred Embodiment The preferred embodiment of the invention preferably resides within the processor-cache-memory-I/O hierarchy of a symmetric multiprocessor 100, as shown in FIG. 1.

System 100 includes one or more processor 101 and cache 102 complexes (e.g., only two are shown in the diagram for brevity, but as is evident, the invention is not limited to any particular number of processors) connected by a data bus 103 and an address bus 104.

The processors and other components of the multiprocessor transmit requests to read or write data residing at a certain address over the address bus 104, while the data residing at that address flows over the data bus 103. The address bus 104 is the mechanism for transmitting the address of the data that is to be referenced, specifying the type of transactions which are to occur (i.e., data write, data read, snoop, etc.), as well as transmitting special-purpose commands, like FCPL.

Other implementations may use a point-to-point network having no buses to connect the processors 101, or combine the address and data onto one bus (e.g., a bidirectional bus or the like), and this invention is relevant to those topologies as well so long as they are cache-coherent multiprocessors that utilize a snoop-based coherency protocol.

A memory controller 109 is also connected to the buses 103, 104. Memory controller 109's main responsibility is to interface between the processors 101, I/O Controller 107, and DRAM memory 108. Also shown are a cache controller 105 and an I/O device 110.

Figure 17:
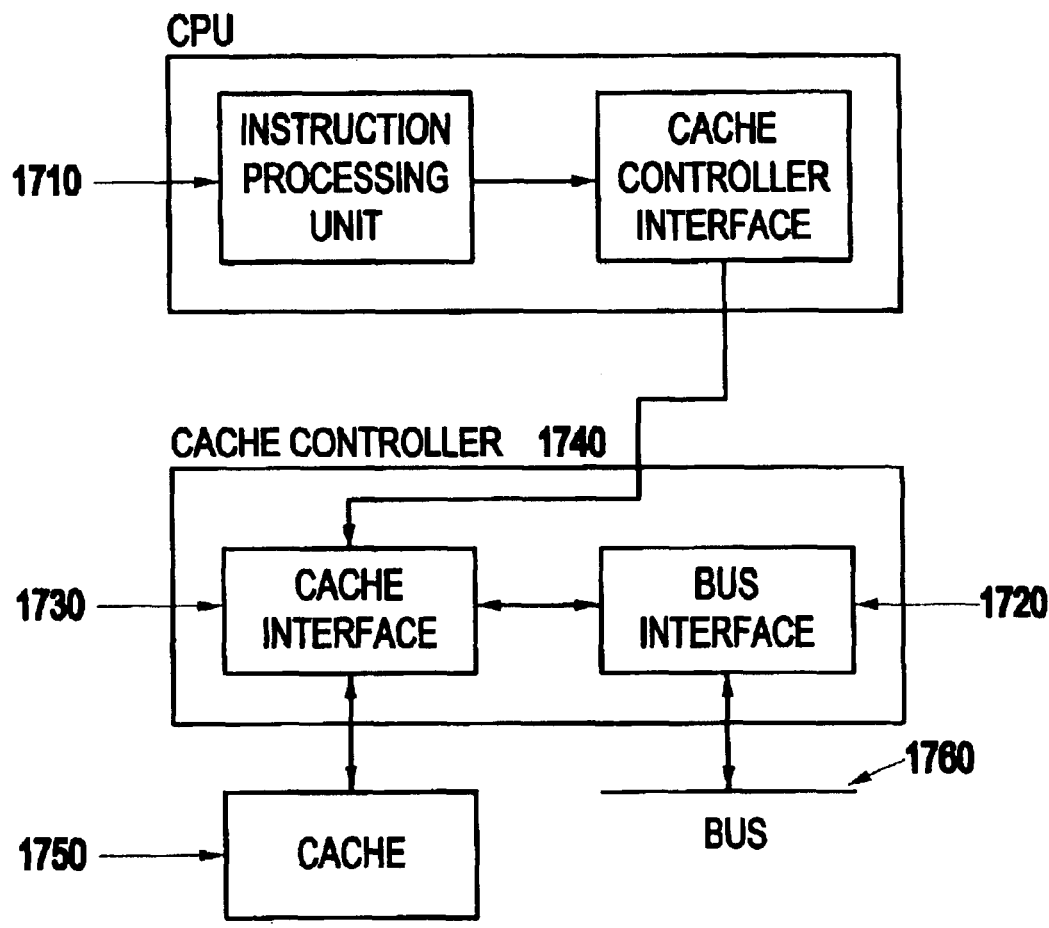
FIG. 17 illustrates an upper level block diagram of functional components of the present invention.
Figure 18:
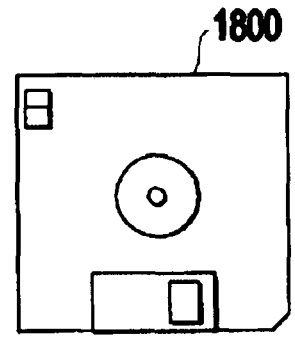
FIG. 18 illustrates a signal bearing medium 1800 (e.g., storage medium) for storing steps of a program of the method according to the present invention.

Over and above the usual functionality associated with these components as embodied in a conventional multiprocessor, the following novel functions are provided by the present invention, as described in further detail below and as shown in FIG. 17.

First, there is included a device for an initiating processor or an I/O Controller to generate a FCPL bus transaction under program control. For example, such a device could be embodied by an instruction processing unit 1710 in FIG. 17, for generating instructions. The FCPL transaction contains the starting address and size in bytes or cache lines of a page of physical memory that is to be flushed out of processor caches and locked.

Secondly, the invention includes a device for the cache controller on the initiating processor to generate a FCPL transaction on the address bus and wait for an acknowledgment from respondent cache controllers. For example, such a device could be embodied by a Bus Interface 1720 in FIG. 17, for generating and receiving bus transactions.

Thirdly, the invention includes a device for a respondent cache controller to receive an FCPL transaction, invalidate and write back all cache lines that reside on the physical page indicated by the FCPL transaction, invalidate Translation Lookaside Buffer (TLB) entries associated with that physical page, and provide an acknowledgment to the initiating processor. For example, such a device could be embodied by a Cache Controller 1740 combination of the Bus Interface 1720 in FIG. 17, and a Cache Interface 1730 in FIG. 17, for flushing cached data to memory.

Fourthly, the invention provides a device for dynamically setting a given memory region to be either "coherent" or "noncoherent" under program control. For example, such a device could be embodied by a hardware memory management unit incorporated in the memory controller (109). A Cache 1750 is provided for storing the locally cached data, and a Bus 1760 is provided for sending/receiving address and data to other processors and memory.

Turning now to FIGS. 2-5, the conventional approaches (and their drawbacks) will be described as a basis of comparison with the method and structure of the invention.

First, if it is assumed that data is clean in all caches (e.g., the common case), then under the current state of the art the following activities must be performed for each cache line in a page (e.g., if a page is 4096 bytes and a cache line is 64 bytes, then this must be repeated 4096/64=64 times). This is problematic as described above and as will be evident below.

Figure 2A:
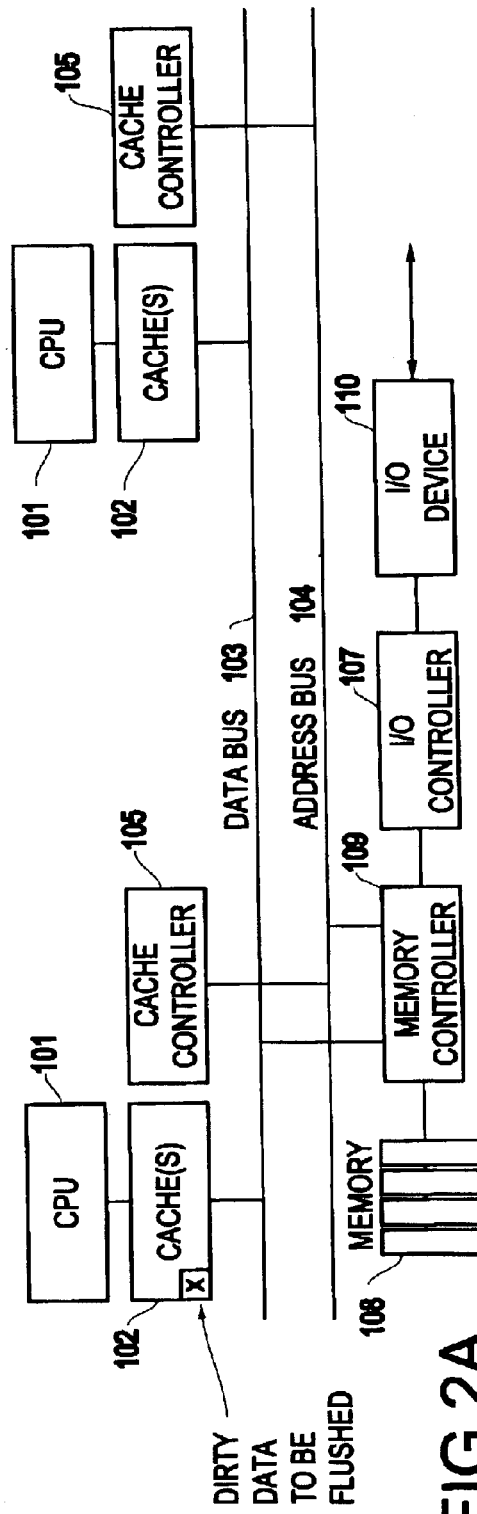
FIGS. 2A–2D illustrate diagrams showing a flush data cache (FDC) instruction approach, and more specifically.
Figure 2B:
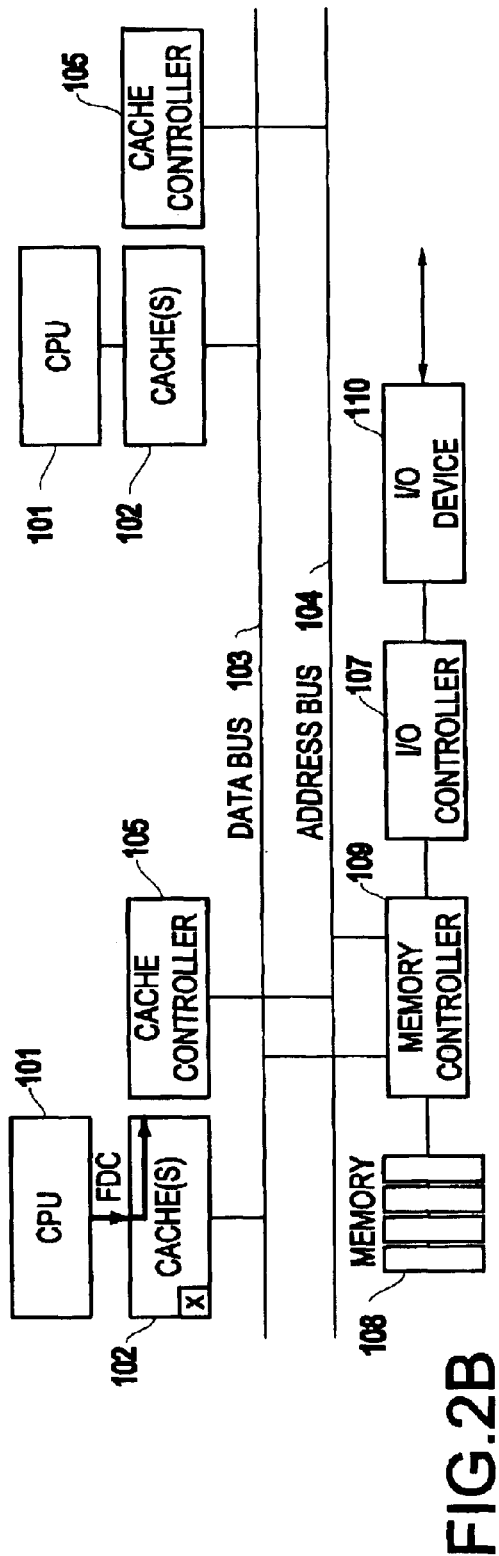
Figure 2C:
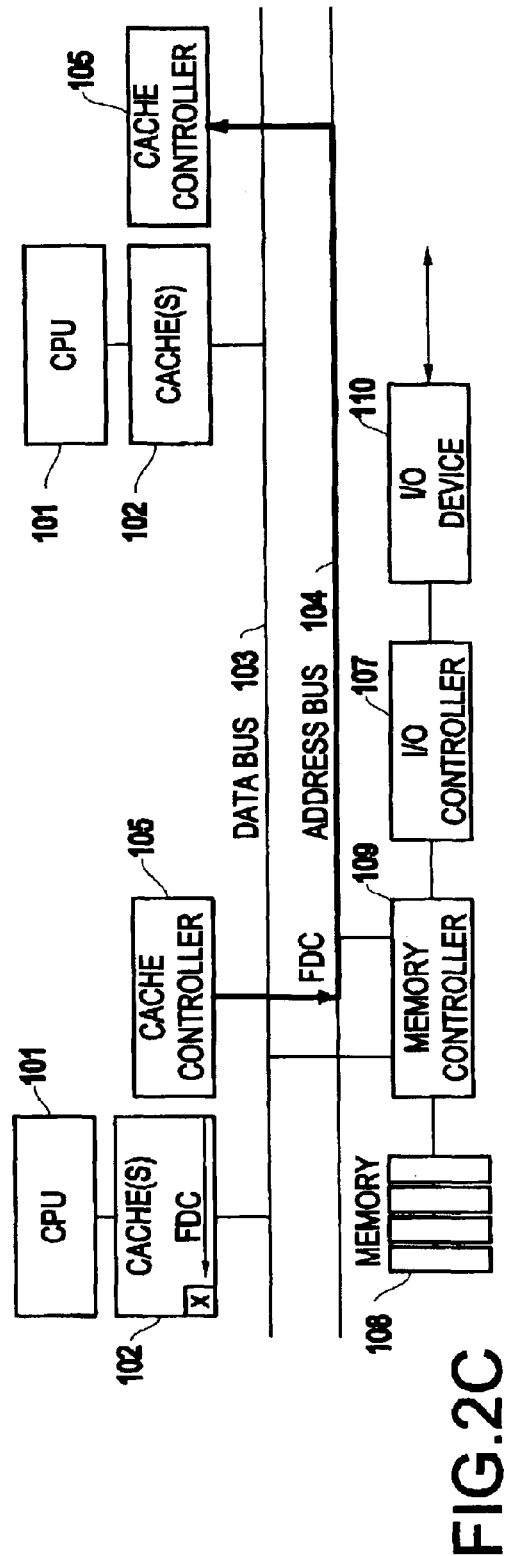
Figure 2D:
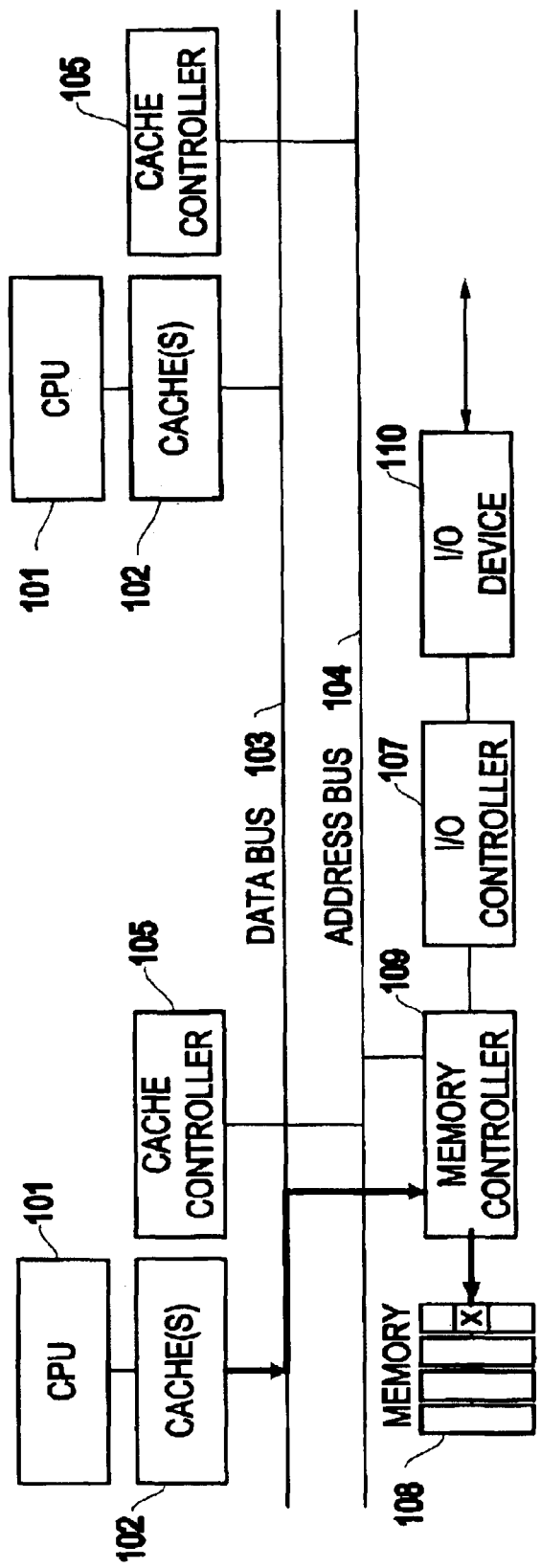
Figure 14:
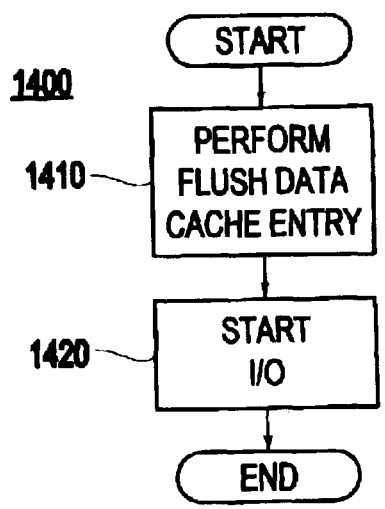
FIG. 14 illustrates a flowchart of the conventional method 1400 according to the present invention.

FIG. 2A illustrates cache data (e.g., dirty data "x") to be flushed. FIG. 2B illustrates a CPU issuing an FDC instruction to a local cache controller, whereas FIG. 2C illustrates the local cache controller commanding all cache controllers to flush dirty data "x". Finally, FIG. 2D illustrates the cache flushing dirty data "x" to the memory.
Processor Operations:

Turning now to FIGS. 2A–2E and the flowchart of FIG. 14, for each cache line in page, the conventional processor 101 performs the following steps.

Figure 15:
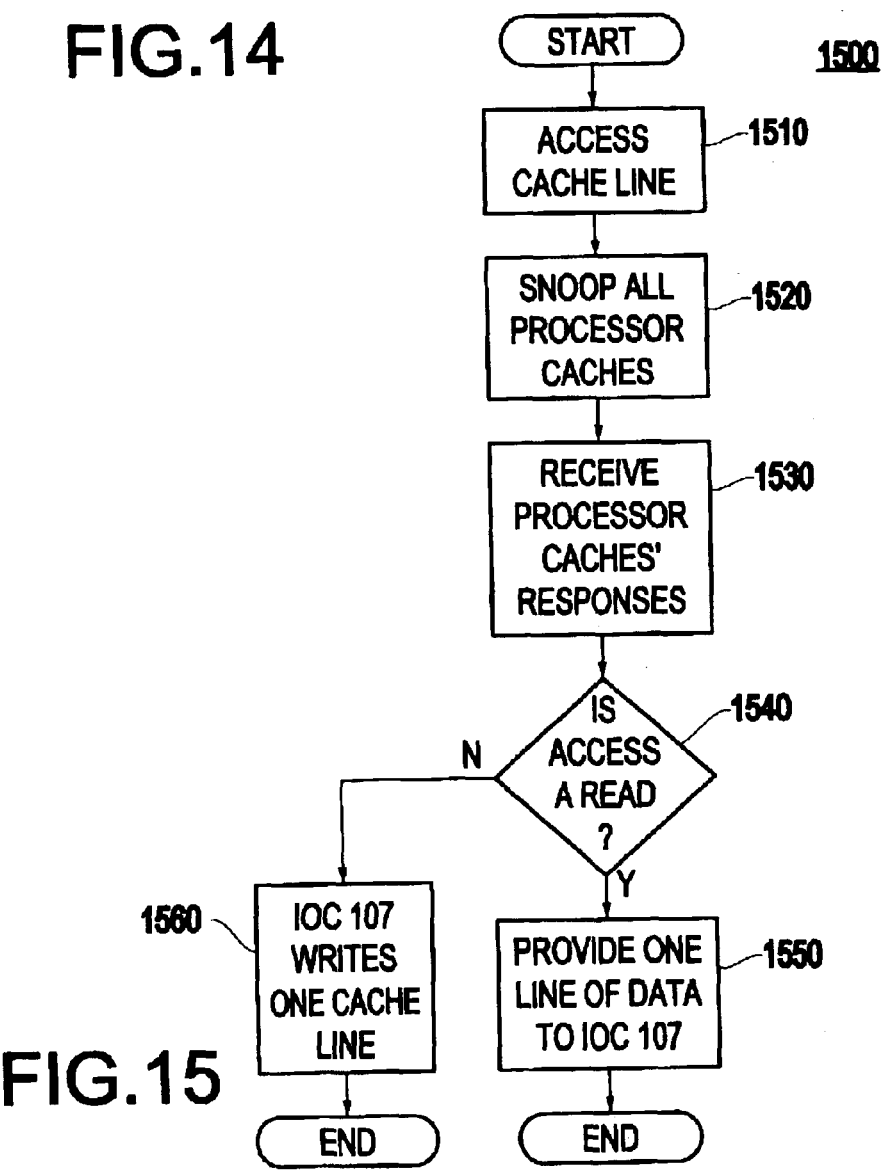
FIG. 15 illustrates a flowchart of the conventional method 1500 of the I/O controller 107 of FIG. 1.

First, in step 1410, the Flush Data Cache Entry (FDCE) instruction is performed, and in step 1420, the I/O is started to/from the target page by signaling the I/O Controller to begin the data transfer.
I/O Controller Operations:

Turning to the flowchart of FIG. 15, for each cache line in page, the conventional I/O controller 107 performs the following steps.

First, in step 1510, as shown in the I/O Read, Request Phase of FIG. 2E, the I/O controller 107 asks the Memory Controller 109 to access one cache line of data.

Figure 3:
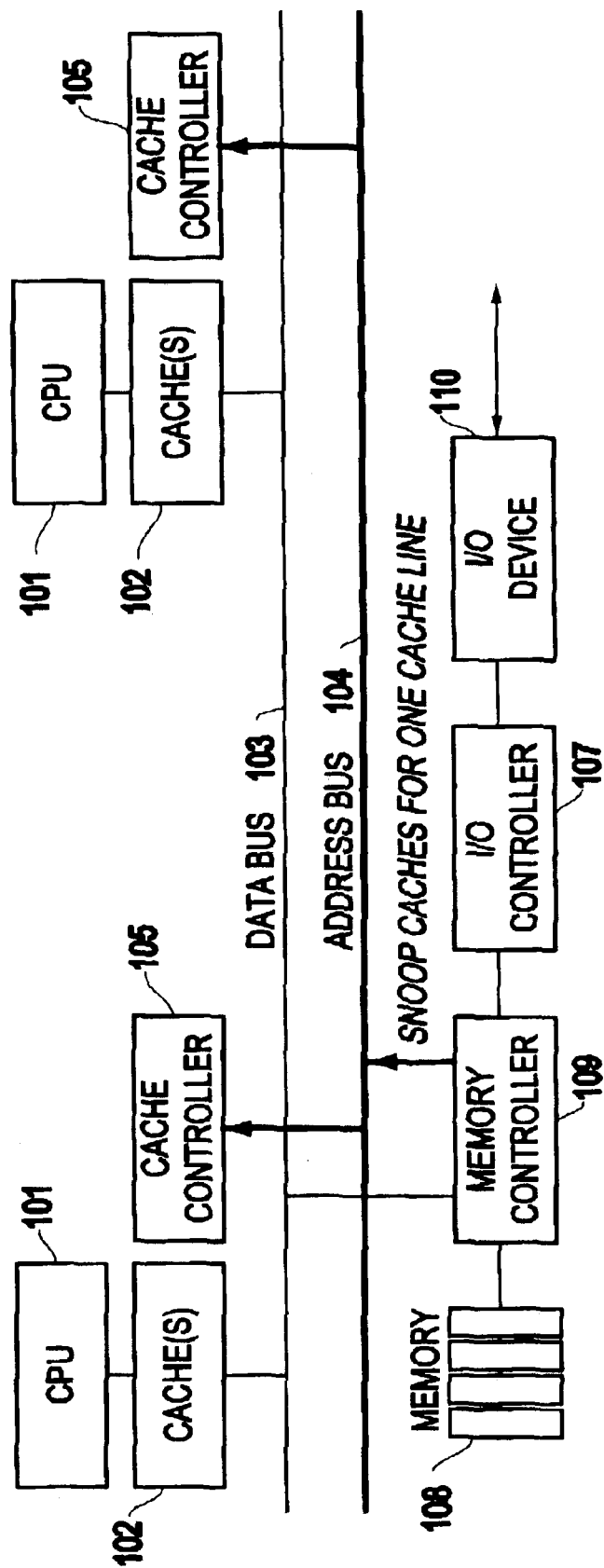
FIG. 3 illustrates an I/O read, snoop phase.

In step 1520, as shown in the I/O Read, Snoop Phase of FIG. 3, the Memory Controller 109 snoops all processor caches for one line of data. It is assumed that the snoop misses, which is the common case.

Figure 4:
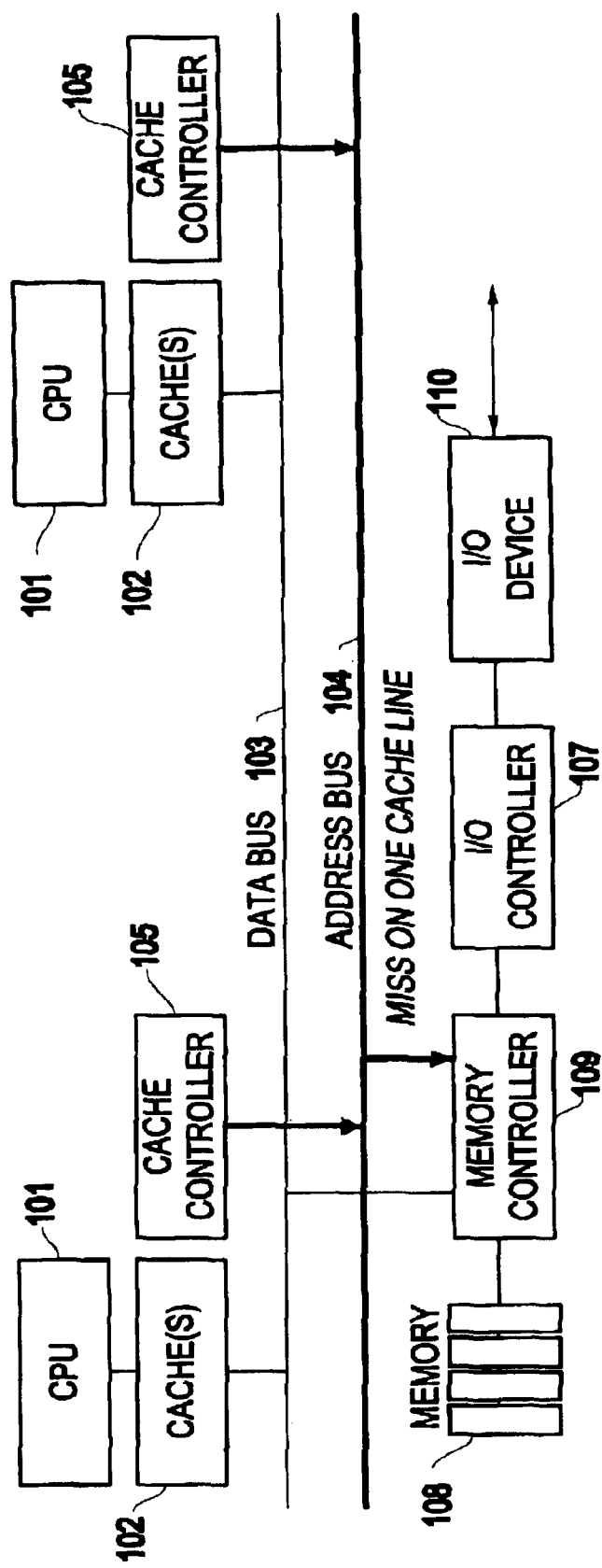
FIG. 4 illustrates an I/O read, snoop response (miss) phase.

In step 1530, as shown in the I/O Read, Snoop Response (Miss) Phase of FIG. 4, the processor caches respond that they do not have a dirty copy of the data.

In step 1540, it is determined whether the access is a read.

Figure 5:
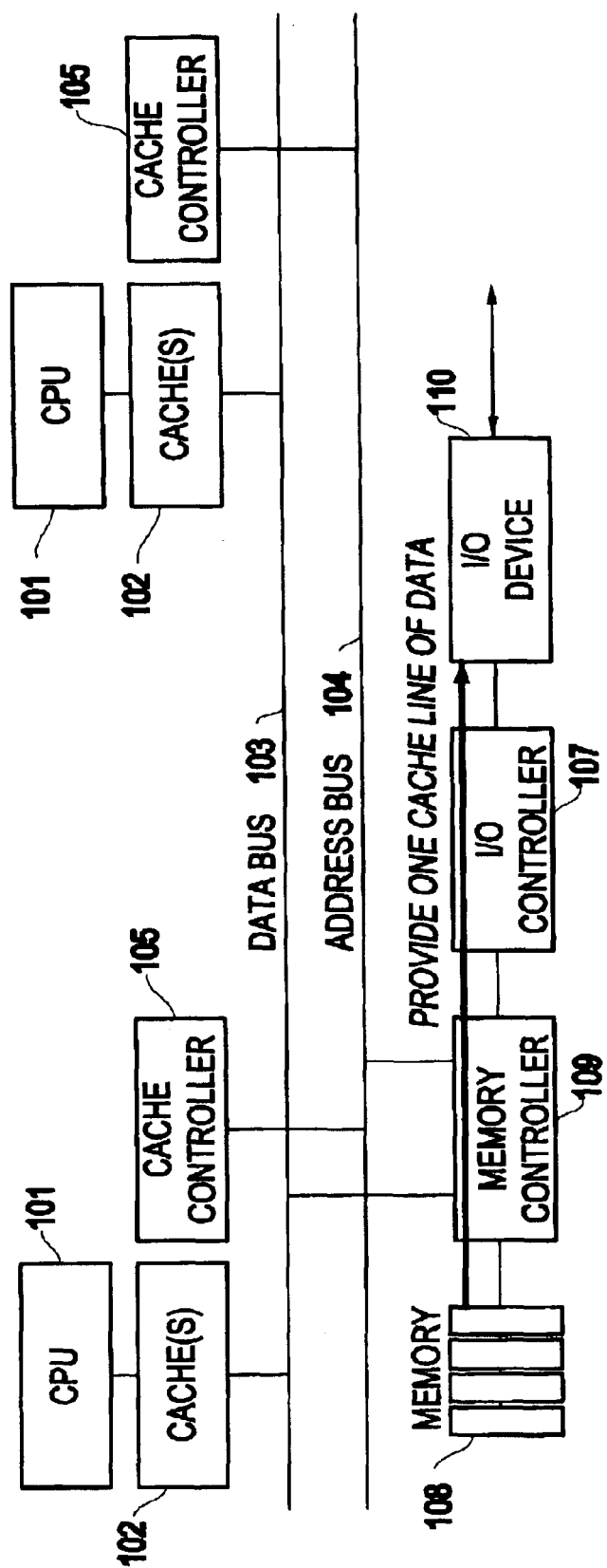
FIG. 5 illustrates an I/O read, memory read phase.

In step 1550, in the I/O Read, Memory Read Phase of FIG. 5, the Memory Controller 109 provides one cache line of data to the I/O Controller 107 if the access is a read.

If, in step 1560 it is determined that the access is a write (e.g., not a read), then the Memory Controller 109 now allows the I/O Controller 107 to write one cache line to the memory 108.

With the above conventional operation, the total cost for the I/O Controller 107 to access one page of physical memory 108 is approximately 64 FDCE instructions per page and 64 snoops per page. This is problematic and burdensome.

Use of FCPL Instruction

Figure 16:
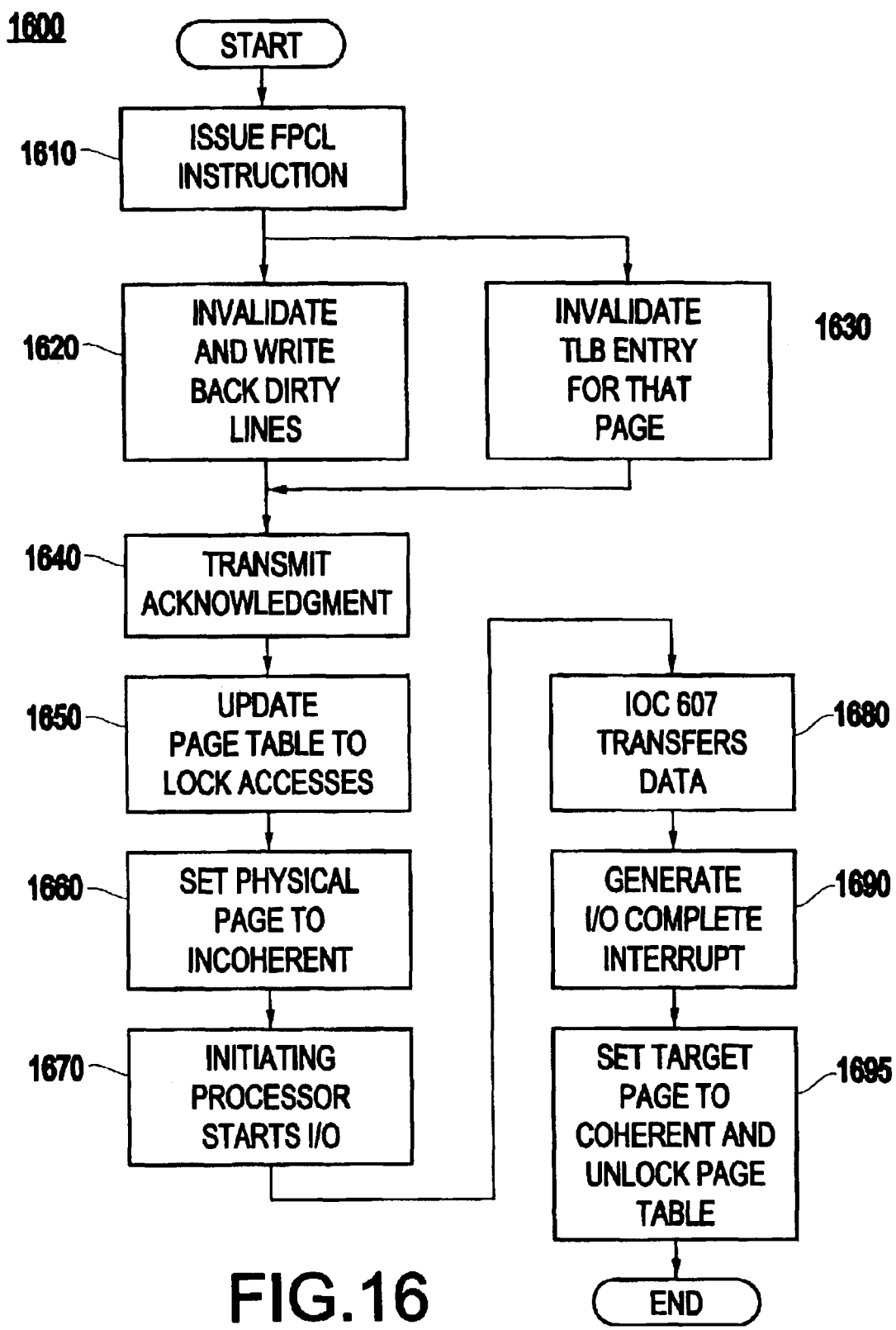
FIG. 16 illustrates a flowchart of the method 1600 according to the present invention.

Turning now to FIGS. 6–13 and the flowchart of FIG. 16, the inventive method and structure are described hereinbelow. Specifically, the invention uses and implements the FCPL transaction and performs the following activities for each page.

Figure 6:
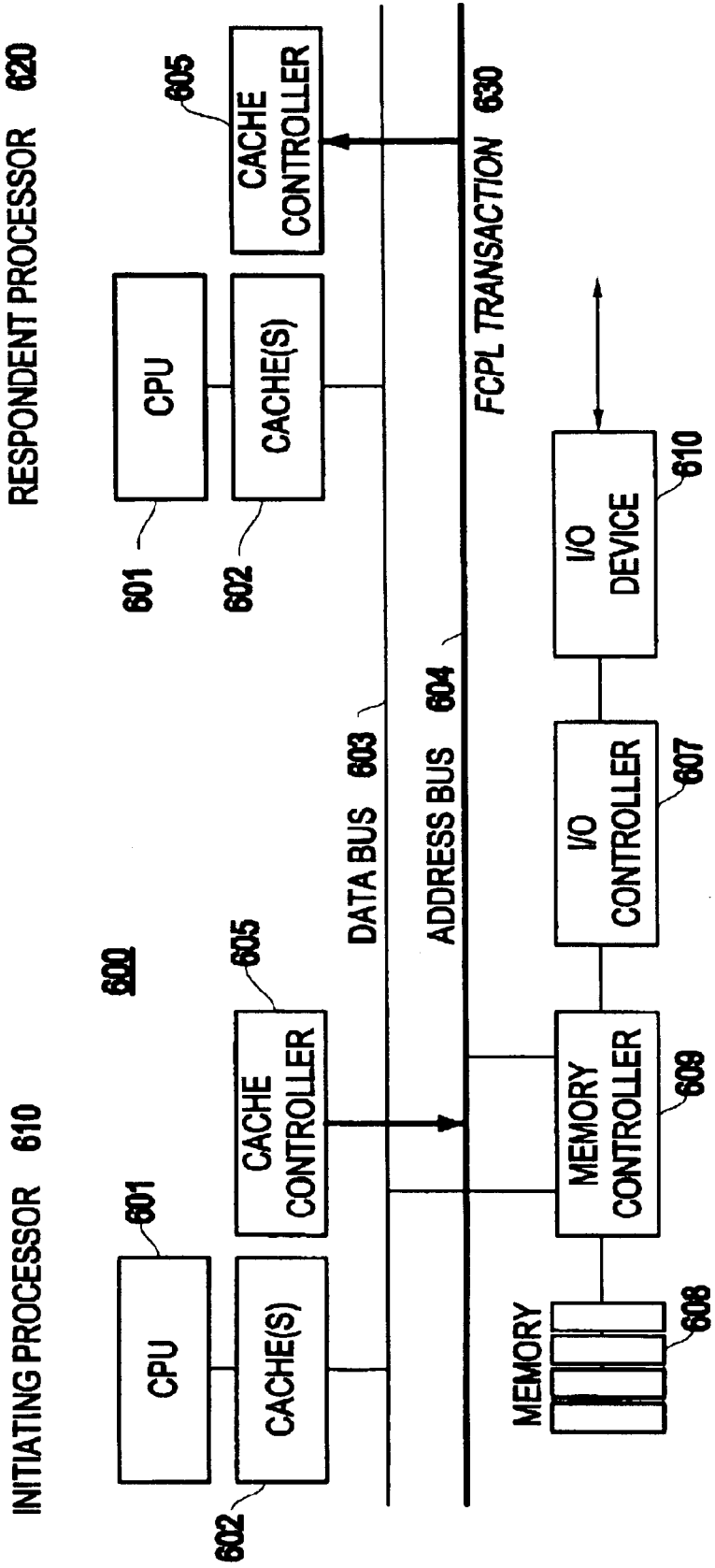
FIG. 6 illustrates a structure 600 in which an initiating processor 610 issues a "flush cache page and lock" (FCPL) transaction command 630.

As shown in FIG. 6, the invention is provided within the processor-cache-memory-I/O hierarchy of a symmetric multiprocessor 600, somewhat similar to that as shown in FIG. 1.

System 600 includes an initiating processor group 610 and a respondent processor group 620. That is, the system includes one or more processor 601 and cache 602 complexes (e.g., only two are shown in the diagram for brevity, but of course, the invention is not limited to any particular number of processors) connected by a data bus 603 and an address bus 604.

The processors and other components of the multiprocessor transmit requests to read or write data residing at a certain address over the address bus 604, while the data residing at that address flows over the data bus 603. The address bus 604 is a mechanism for transmitting the address of the data that is to be referenced, specifying the type of transactions which are to occur (i.e., data write, data read, snoop, etc.), as well as transmitting special-purpose commands, like FCPL 630, as shown in FIG. 6.

Other implementations may use a point-to-point network having no buses to connect the processors 601, or combine the address and data onto one bus (e.g., a bidirectional bus or the like), and this invention is relevant to those topologies as well so long as they are cache-coherent multiprocessors that utilize a snoop-based coherency protocol.

A memory controller 609 is also connected to the buses 603, 604. Memory controller 609's main responsibility is to interface between the processors 601, I/O Controller 607, and DRAM memory 608. Also shown are a cache controller 605 and an I/O device 610.

In step 1610, first the processor 601 that is requesting I/O (called the "initiating processor") issues the FCPL transaction 630 and waits for acknowledgments from all other processors 601. Alternatively, this could be a deferred transaction, meaning that the initiating processor does not wait until the transaction has completed (as shown in FIG. 6).

Figure 7:
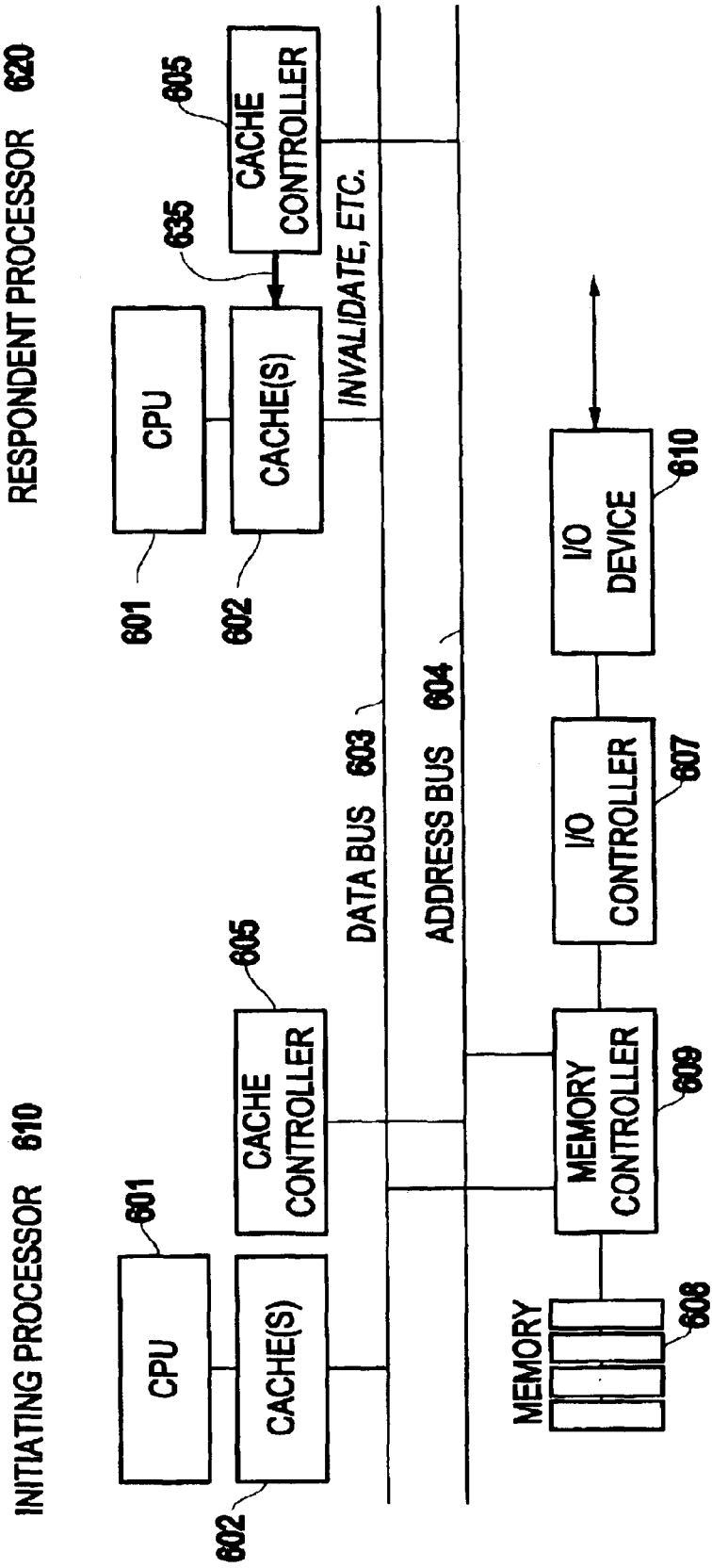
FIG. 7 illustrates a respondent processor 620 invalidating lines, writing back "dirty" lines, and invalidating a TLB entry.

Then, in step 1620, each respondent processor cache 602 on the bus 603 invalidates (e.g., reference numeral 635) and writes back dirty lines on that page (e.g., the common case is that very few lines will be in the caches or dirty), as shown in FIG. 7.

Concurrently, in step 1630 each respondent processor 620 invalidates the TLB entry for that page, as shown in FIG. 7.

Figure 8:
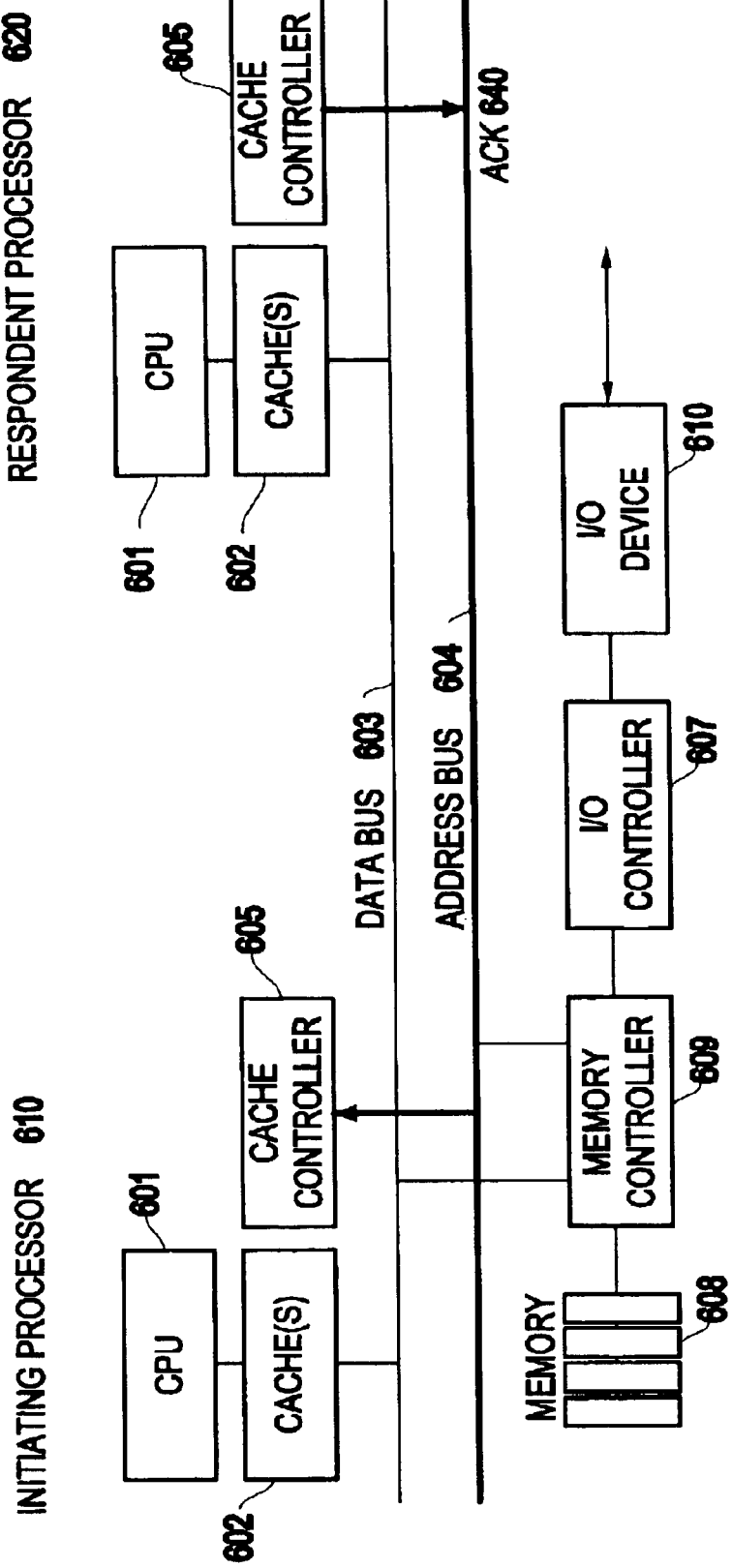
FIG. 8 illustrates the respondent processor 620 acknowledging an FCPL transaction.

In step 1640, when a respondent processor 601 has invalidated and written back dirty lines and invalidated the TLB entry for that page, it transmits an acknowledgment (ACK) 640 over the address bus 604, as shown in FIG. 8. There must be an acknowledgment from every CPU (e.g., respondent processors 620) involved, when they are done.

Figure 9:
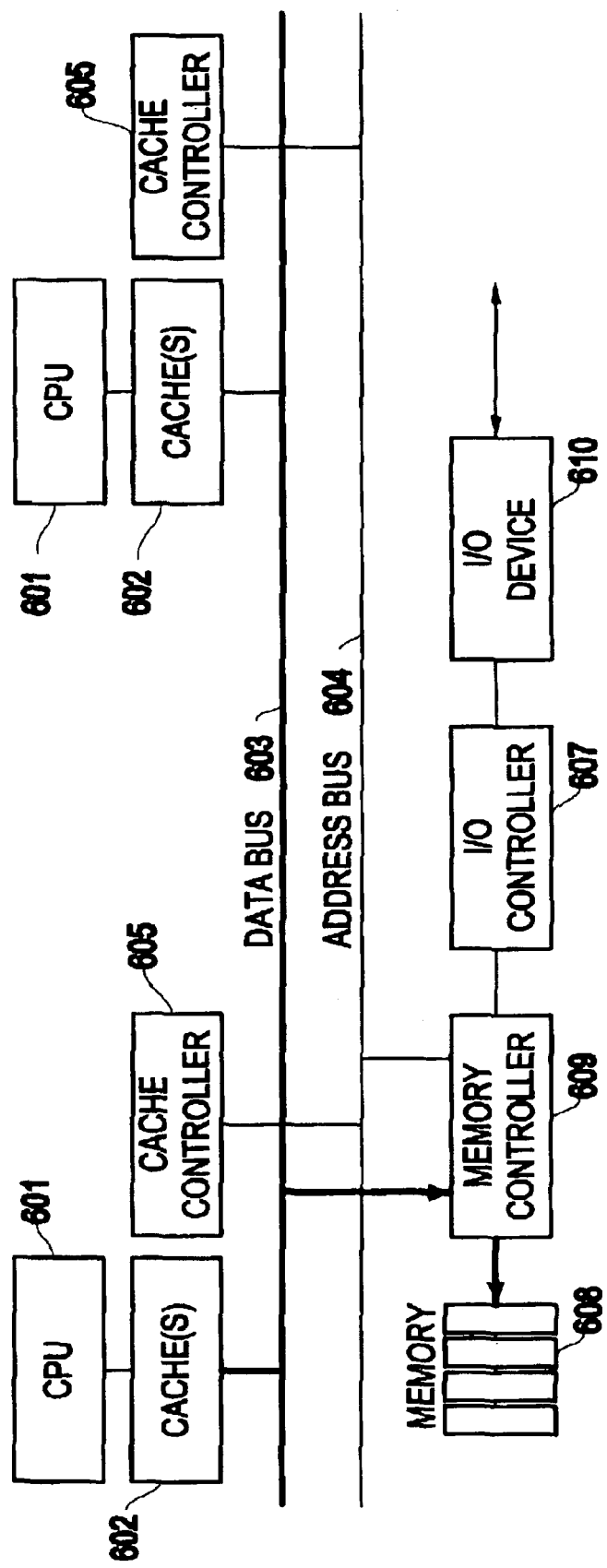
FIG. 9 illustrates an updating of a page table to lock the page and setting a target page to noncoherent.

In step 1650, upon receipt of an acknowledgment from all respondent processors 620, the initiating processor 610 updates the page table to lock accesses to physical page for which I/O is imminent, as shown in FIG. 9.

In step 1660, the initiating processor sets the physical page for which I/O is imminent to "noncoherent" by manipulating the appropriate registers in the memory controller 609. Such manipulation is well-known to those of ordinary skill in the art.

This operation prevents the memory controller 609 from generating snoops to the processor caches 602 when the I/O Controller 607 accesses the target page, as shown in FIG. 9.

Figure 10:
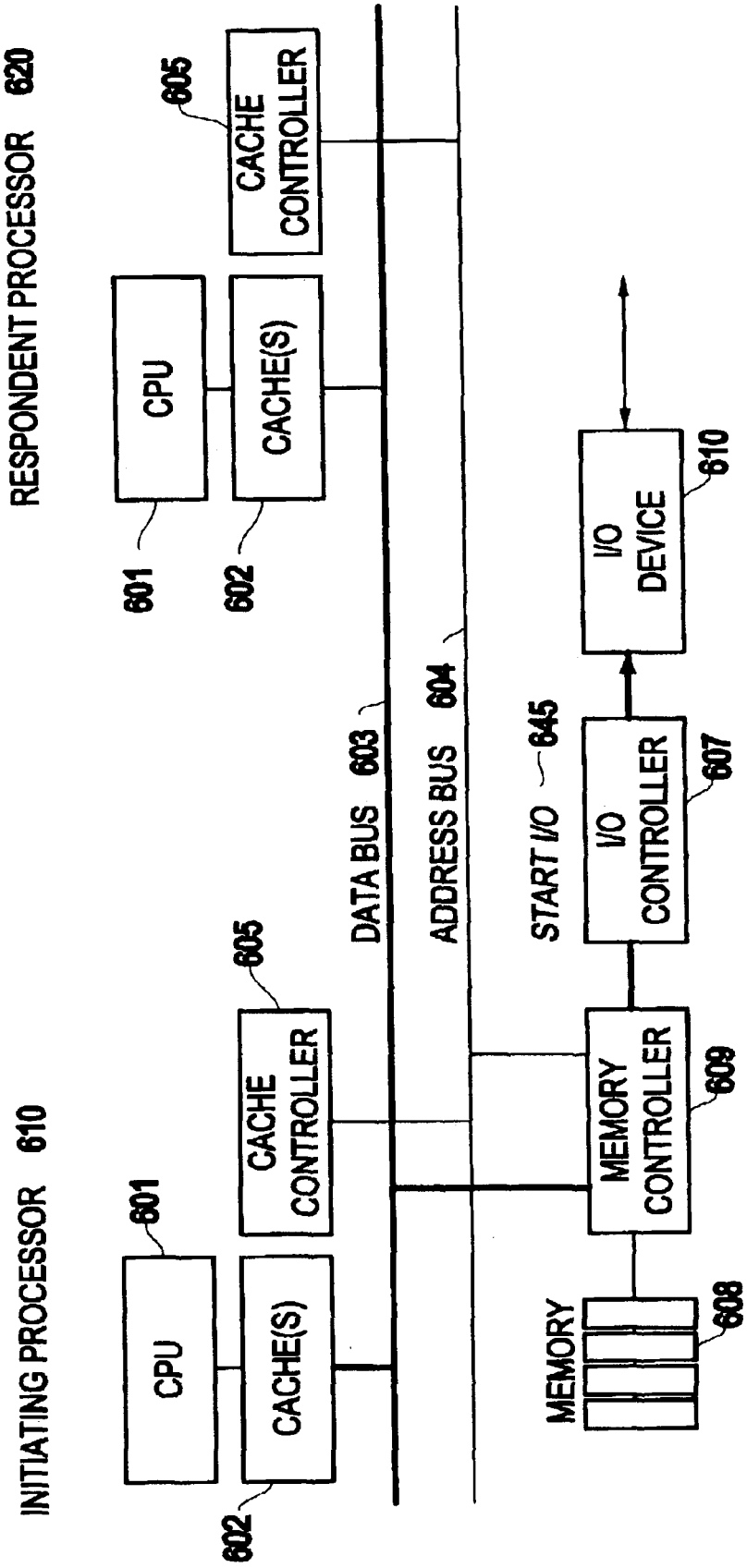
FIG. 10 illustrates an initiating processor signal I/O controller 645 to start the I/O operation.

In step 1670, the initiating processor starts I/O (e.g., reference numeral 645) to/from the target page by signaling the I/O Controller 607 to begin the data transfer, as shown in FIG. 10.

Figure 11:
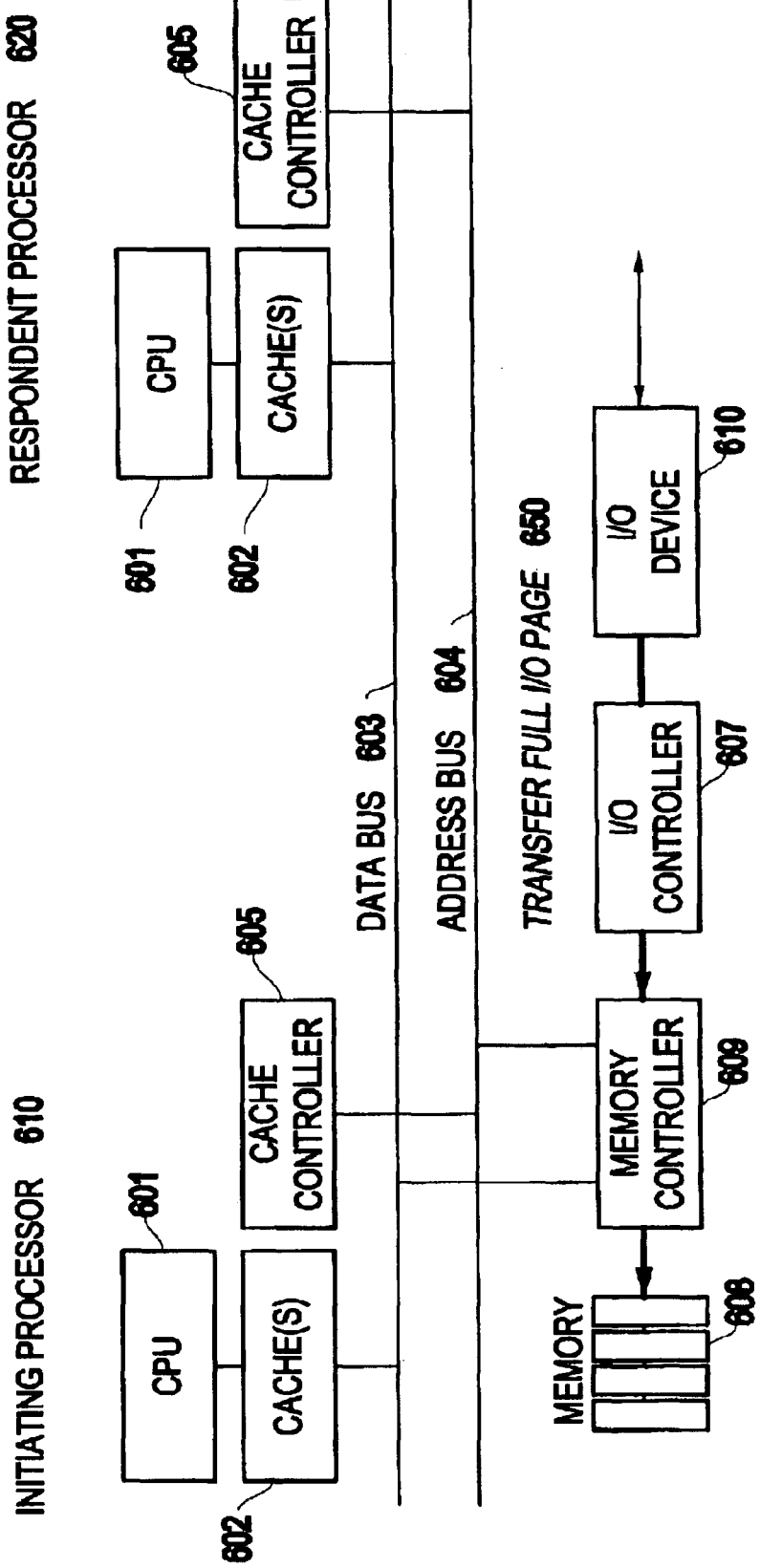
FIG. 11 illustrates the I/O device 610 accessing host memory.

In step 1680, the I/O controller 607 transfers data (either reads from memory or writes to memory) between the I/O Device 610 and the Memory 608, as shown in FIG. 11. That is, a full I/O page transfer 650 is performed by the I/O device without any accesses being performed on the front side (the data bus).

Figure 12:
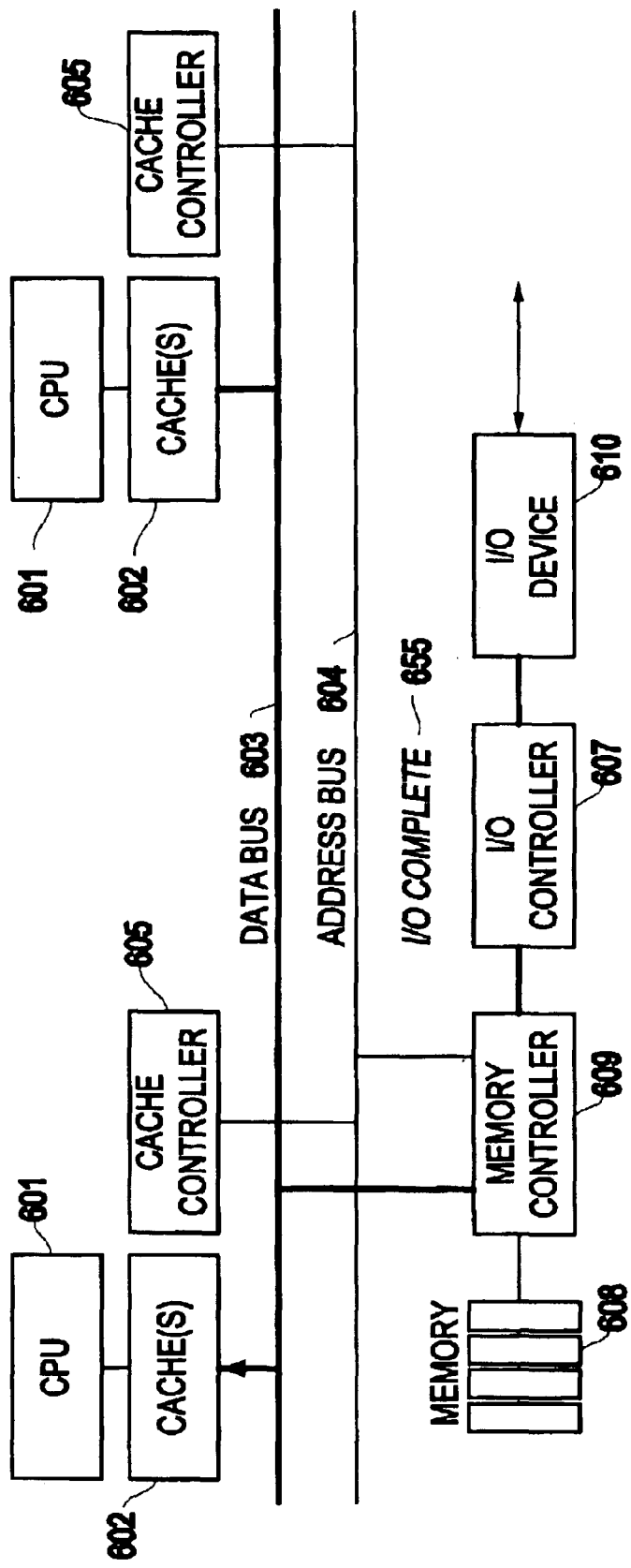
FIG. 12 illustrates the I/O controller 607 signaling that I/O is done to the initiating processor 610.

In step 1690, when the I/O is complete (e.g., reference numeral 655), the I/O Controller 607 generates an "I/O Complete" interrupt to the initiating processor 610, as shown in FIG. 12.

Figure 13:
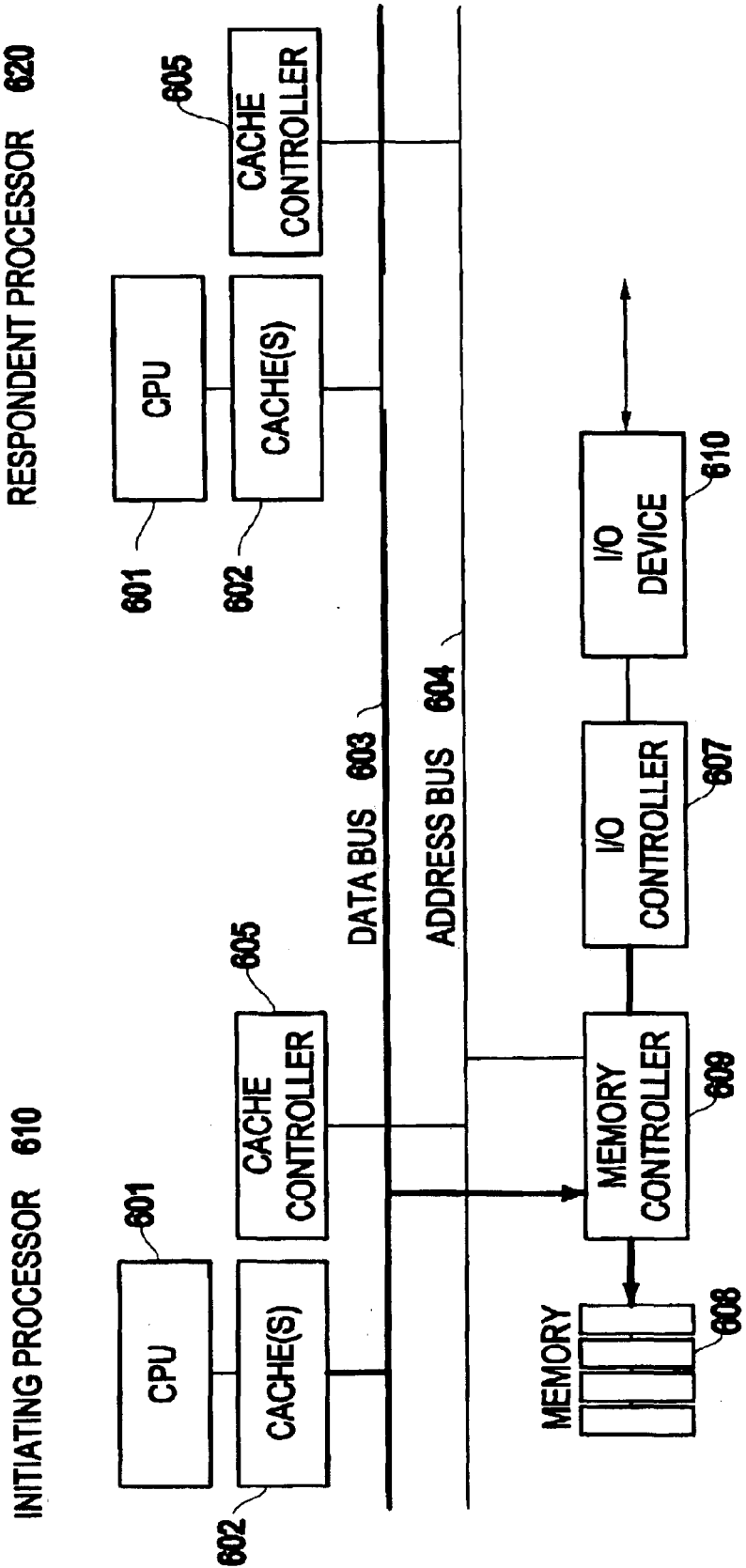
FIG. 13 illustrates the updating of a page table to unlock the page and setting a target page to coherent.

In step 1695, when the I/O Complete interrupt is received, the initiating processor sets the target page to "coherent" and unlocks the page table, by manipulating the appropriate registers in the memory controller 609, thereby allowing all processors 601 to access the physical page, as shown in FIG. 13.

The total cost of the above method of the invention is one bus transaction for the FCPL, one writeback for every dirty cache line, one acknowledgment for each respondent processor 601, two page table entry manipulations, and two memory controller register manipulations. Thus, much savings result over the conventional method.

If a large block of I/O is anticipated, then some operations (especially the page table manipulations) corresponding to several target pages can be aggregated for efficiency.

In addition to the hardware/software environment described above, a different aspect of the invention includes a computer-implemented method for performing the above method 1600. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 601, as represented by the fast-access storage for example. Alternatively, the instructions may be contained in another signal-bearing media, such as a magnetic data storage diskette 1800 (FIG. 18), directly or indirectly accessible by the CPU 601.

Whether contained in the diskette 1800, the computer/CPU 601, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, as described above, with the present invention, a method and structure is provided in which an entire page (blocks) of a cache can be flushed in one bus transaction. Further, the inventive mechanism can flush blocks of lines having different, arbitrary sizes.

Additionally, the invention locks that page by invoking a new "flush cache page and lock" (FCPL) transaction, which can be invoked either by a processor or an I/O Controller.

Further, a programmer is allowed to flush an entire page (block) of data from the cache in one bus transaction and then lock that page by invoking a new "flush cache page and lock" (FCPL) transaction, which can be invoked either by a processor or an I/O Controller. Such pages (blocks) may have different, arbitrary sizes. Preferably, an FCPL transaction according to the invention contains a starting physical address of a page, and a number of lines (or bytes) in that page.

When any processor cache receives this transaction on its address bus, it finds and invalidates all lines residing in the indicated page prior to responding to the initiator of the transaction that the transaction has been completed.

During the invalidation process, each processor cache controller that receives the FCPL transaction searches its local cache for all copies of the data on that page. Accordingly, dirty copies are written back to memory, and both dirty and clean copies are marked as invalid.

While the invention has been described in terms of several preferred embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A method of improving performance of a multiprocessor system, comprising:
   proactively flushing and locking an arbitrarily-sized region of memory out of caches of said multiprocessor system;
   initiating one of a processor and an input/output (I/O) controller to generate a flush cache page and lock (FCPL) bus transaction under program control;
   receiving, in a respondent cache controller, said FCPL bus transaction, and invalidating and writing back all cache lines that reside on a physical page indicated by the FCPL bus transaction; and
   invalidating Translation Lookaside Buffer (TLB) entries associated with said physical page, and providing an acknowledgment to an initiating processor.

2. The method of claim 1, wherein said FCPL bus transaction contains a starting address and size in bytes or cache lines of a page of physical memory that is to be flushed out of processor caches and locked.

3. The method of claim 1, further comprising:
   generating, by a cache controller on an initiating processor, said FCPL bus transaction on an address bus and waiting for an acknowledgment from a respondent cache controller.

4. The method of claim 1, further comprising:
   dynamically setting a given memory region to be either "coherent" or "noncoherent" under program control.

5. The method of claim 1, further comprising:
   providing a processor-cache-memory-I/O hierarchy of a symmetric multiprocessor system, said multiprocessor system including an initiating processor group and a respondent processor group,
   said multiprocessor system including at least one processor and cache complex connected by a data bus and an address bus,
   processors of the multiprocessor system transmitting requests to read or write data residing at an address over the address bus, while data residing at said address flows over the data bus,
   a memory controller being connected to said address bus and said data bus and interfacing between the processors, an input/output (I/O) Controller, and a dynamic random access memory (DRAM), and
   a memory controller connected to said I/O controller, and air I/O device connected to said I/O controller.

6. The method of claim 1, wherein said multiprocessor system comprises a cache-coherent multiprocessor system that utilizes a snoop-based coherency protocol.

7. A method of improving performance of a multiprocessor system, comprising:
   issuing a flush cache page and lock (FCPL) transaction and waiting for acknowledgments from all other processors of said multiprocessor system;
   invalidating and writing back dirty lines on a cache page associated with said FCPL transaction;
   concurrently invalidating a Table Lookaside Buffer (TLB) entry for said cache page;
   transmitting an acknowledgment over an address bus;
   updating a page table to lock accesses to a physical page for which input/output (I/O) is imminent;
   setting the physical page for which I/O is imminent to "noncoherent", thereby to prevent snoops to processor caches when accesses to a target page are made;
   starting I/O to/from the target page;
   transferring data between an I/O Device and a memory;
   generating an "I/O Complete" interrupt; and
   setting the target page to "coherent" and unlocking the page tables,
   wherein said updating is performed by an initiating processor upon receipt of an acknowledgment from said all other processors, said all other processors being respondent processors, and
   wherein said setting is performed by the initiating processor by manipulating registers in a memory controller, thereby to prevent the memory controller from generating snoops to the processor caches when an I/O controller accesses the target page.

8. The method of claim 7, wherein said issuing is performed by an initiating processor that is requesting input/output (I/O),
   wherein said invalidating and writing back is performed by each respondent processor cache on the bus, and wherein said "I/O Complete" interrupt is issued to the initiating processor.

9. The method of claim 7, wherein said concurrently invalidating is performed by each respondent processor, and wherein said transmitting is performed by said respondent processor after said respondent processor has invalidated and written back dirty lines and invalidated the TLB entry for said cache page.

10. The method of claim 7, wherein said starting is performed by an initiating processor by signaling an I/O Controller to begin data transfer, and wherein said transferring is performed by the I/O controller.

11. The method of claim 7, wherein said generating is performed when the I/O is complete and is performed by an I/O Controller, and wherein said setting is performed when the "I/O Complete" interrupt is received and is performed by an initiating processor, thereby to allow all processors to access the physical page.

12. A method of improving performance of a multiprocessor system, comprising:

issuing a flush cache page and lock (FCPL) transaction and waiting for acknowledgments from all other processors of said multiprocessor system;

invalidating and writing back dirty lines on a cache page associated with said FCPL transaction;

concurrently invalidating a Table Lookaside Buffer (TLB) entry for said cache page;

transmitting an acknowledgment over an address bus;

updating a page table to lock accesses to a physical page for which input/output (I/O) is imminent;

setting the physical page for which I/O is imminent to "noncoherent", thereby to prevent snoops to processor caches when accesses to a target page are made;

starting I/O to/from the target page;

transferring data between an I/O Device and a memory;

generating an "I/O Complete" interrupt; and setting the target page to "coherent" and unlocking the page table, wherein said method uses a single bus transaction for the FCPL, a single write-back for every dirty cache line, a single acknowledgment for each respondent processor, two page table entry manipulations, and two memory controller register manipulations.

13. A system for improving performance of a multiprocessor system, comprising:

a device for one of an initiating processor and an I/O Controller to generate a flush cache and page lock (FCPL) bus transaction under program control;

a device for a cache controller on the initiating processor to generate an FCPL bus transaction on an address bus and wait for an acknowledgment from respondent cache controllers;

a device for a respondent cache controller to receive an FCPL bus transaction, invalidate and write back all cache lines that reside on a physical page indicated by the FCPL bus instruction, invalidate Translation Lookaside Buffer (TLB) entries associated with said physical page, and provide an acknowledgment to the initiating processor; and a device for dynamically setting a given memory region to be either "coherent" or "noncoherent" under program control.

wherein the FCPL bus instruction contains a starting address and size of a page of physical memory that is to be flushed out of processor caches and locked.

14. A system for improving performance of a multiprocessor system, comprising:

a device for one of an initiating processor and an I/O Controller to generate a flush cache and page lock (FCPL) bus transaction under program control;

a device for a cache controller on the initiating processor to generate an FCPL bus transaction on an address bus and wait for an acknowledgment from respondent cache controllers;

a device for a respondent cache controller to receive an FCPL bus transaction, invalidate and write back all cache lines that reside on a physical page indicated by the FCPL bus instruction, invalidate Translation Lookaside Buffer (TLB) entries associated with said physical page, and provide an acknowledgment to the initiating processor; and a device for dynamically setting a given memory region to be either "coherent" or "noncoherent" under program control, wherein said system uses a single bus transaction for the FCPL, a single writeback for every dirty cache line, a single acknowledgment for each respondent processor, two page table entry manipulations, and two memory controller register manipulations.

15. A signal-bearing medium tangibly embodying a program of machine-readable instructions executable by a digital processing apparatus to perform a method of improving performance of a multiprocessor system, said method comprising:

issuing a flush cache page and lock (FCPL) transaction and waiting for acknowledgments from all other processors of said multiprocessor system;

invalidating and writing back dirty lines on a cache page associated with said FCPL transaction;

concurrently invalidating a Table Lookaside Buffer (TLB) entry for said cache page;

transmitting an acknowledgment over an address bus;

updating a page table to lock accesses to a physical page for which input/output (I/O) is imminent;

setting the physical page for which I/O is imminent to "noncoherent", thereby to prevent snoops to processor caches when accesses to a target page are made;

starting I/O to/from the target page;

transferring data between an I/O Device and a memory;

generating an "I/O Complete" interupt; and setting the target page to "coherent" and unlocking the page table, wherein said updating is performed by an initiating processor upon receipt of an acknowledgment from said all other processors, said all other processors being respondent processors, and wherein said setting is performed by the initiating processor by manipulating registers in a memory controller, thereby to prevent the memory controller from generating snoops to the processor caches when an I/O controller accesses the target page.

* * * * *